March 21, 1944.  M. A. STICELBER  2,344,836
BREAD MOLDING MACHINE
Filed Feb. 9, 1942  3 Sheets-Sheet 1
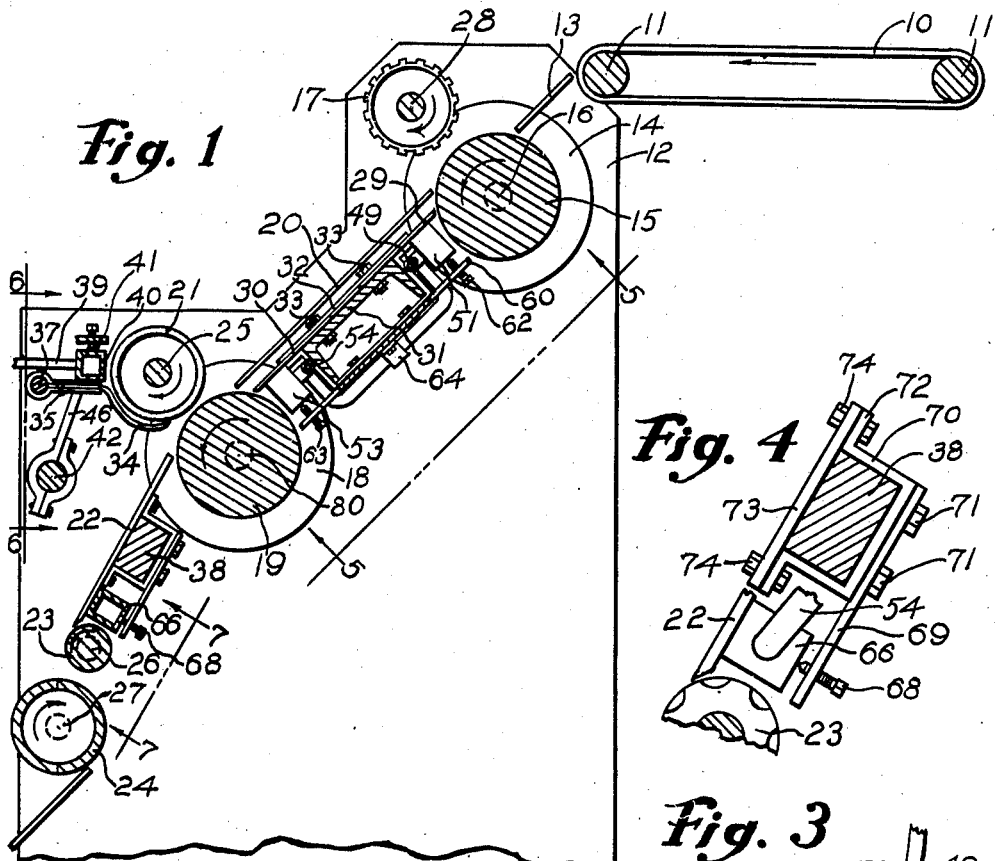
INVENTOR.
Merlin A. Sticelber
BY Alfred R. Fuchs
ATTORNEY.

March 21, 1944.  M. A. STICELBER  2,344,836
BREAD MOLDING MACHINE
Filed Feb. 9, 1942  3 Sheets-Sheet 2

INVENTOR.
Merlin A. Sticelber
BY Alfred R. Fuchs
ATTORNEY.

March 21, 1944.  M. A. STICELBER  2,344,836
BREAD MOLDING MACHINE
Filed Feb. 9, 1942  3 Sheets-Sheet 3
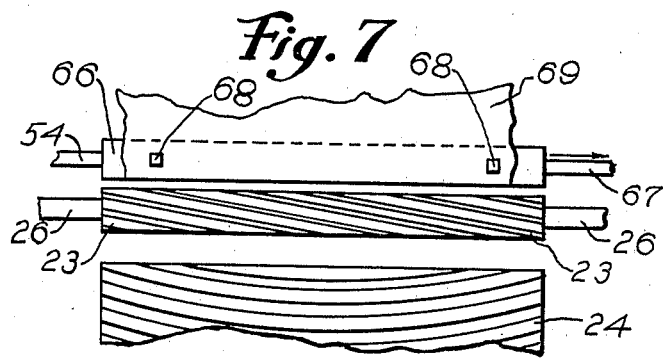
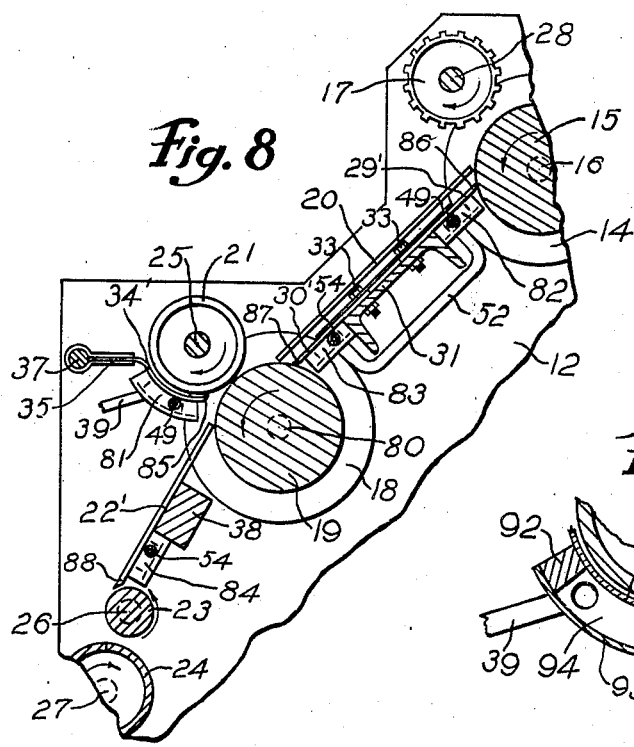
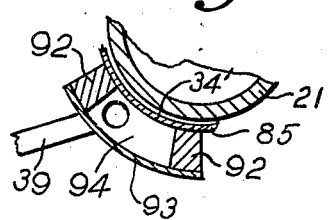
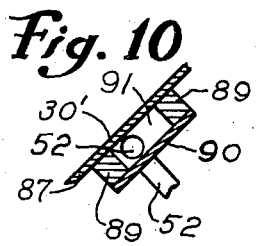
INVENTOR.
Merlin A. Sticelber
BY Alfred R. Fuchs
ATTORNEY.

Patented Mar. 21, 1944

2,344,836

UNITED STATES PATENT OFFICE 2,344,836

BREAD MOLDING MACHINE

Merlin A. Sticelber, Kansas City, Mo.

Application February 9, 1942, Serial No. 429,968

6 Claims. (Cl. 107—9)

My invention relates to bakery machinery, and more particularly to a dough shaping or molding machine.

In machines of the general type shown in the patent to Overkamp and Streich 901,031, patented October 13, 1908, for Loaf forming machine, and the patent to Hueg 875,930, patented January 7, 1908, for Dough shaping machine, which machines are used for molding loaves of bread and similar purposes, there are rollers provided for rolling out the dough into a sheet-like form and for curling the sheeted dough on itself to form a roll of the dough, which produces the loaf. In order to obtain the proper functioning of the machine it is necessary that the dough engaging surfaces of certain of these rollers be kept clean, so that said surfaces remain smooth and so that the pieces of dough will not stick thereto and said rollers will perform their sheeting or other operations, and in order to accomplish this scrapers are ordinarily provided for cleaning any accumulation of dough from the rollers. However, the friction of said scrapers on the rollers creates considerable heat and the dough which is in a warm condition, when it reaches the molding machine, is heated by the heat produced on the surface of the rollers by the scraping devices to such an extent that it becomes so sticky as to tend to adhere to the rollers.

In machines of the above mentioned character it is customary to feed in rounded pieces of dough, that have been proofed to a certain extent, at a regular rate at spaced intervals into the entrance end of the machine. Accordingly, if any sticking on any of the rollers of any of the pieces of dough occurs in their progress through the machine, this will cause either mutilated loaves of bread that are not of proper shape due to such sticking action, or the adherence of two or more pieces of dough to each other in going through the machine, due to the fact that the pieces of dough have been delayed in their progress through the machine because of the sticking action, and such doubles will, of course, produce loaves of improper size, which must be removed from the machine and returned to the divider. Due to these difficulties encountered in the machine, it is customary to apply large quantities of dusting flour to the rollers to reduce the sticking action. However, the use of such large amounts of dusting flour causes flour streaks in the dough and in the finished loaf of bread, which is, of course, undesirable, and even when large quantities thereof are used the sticking even then occurs occasionally and interferes with the operation of the machine, sometimes making it necessary to stop the machine and clean off the rollers.

It is the principal purpose of my invention to provide means for cooling the scrapers and the rollers, either through the agency of the scrapers or by direct cooling of the rollers, to thus prevent the undue heating of the rollers and the sticking of the dough thereto. I have discovered that by properly cooling the rollers in a dough sheeting, or bread or loaf molding machine, the sticking that usually takes place can be entirely eliminated and the large quantities of dusting flour used in such machines can be reduced to a minimum, and in fact in some cases entirely avoided.

I have found that in rollers in machines of this character the sticking action is not prevented by the use of large quantities of flour, but is only reduced, and that less sticking will take place if the temperature is kept at a proper point at which the dough will not be at a stage having such stickiness as to tend to adhere to the rollers and, preferably, such cooling is obtained that the rollers will have the surfaces thereof moistened, this moistening either taking place from frost or ice formed on the cooling elements contacting the surface of the rollers or by the cooling of the rollers to the extent that the moisture in the air will be condensed thereon to thus moisten the surface of the rollers with which the dough engages.

While such moistening is preferred, it is not absolutely necessary to accomplish my purpose, as any cooling sufficiently to prevent sticking will reduce the use of dusting flour tremendously from that now necessary, and as above pointed out, in many cases will make it unnecessary to use any dusting flour in the molding machine itself.

Other objects and advantages of my invention will appear as the description of the drawings proceeds. I desire to have it understood, however, that I do not intend to limit myself to the particular details shown as described except as defined in the claims.

In the drawings:

Fig. 1 is a vertical sectional view through a portion of a molding machine, a portion of the frame being shown in elevation, showing my invention applied to said molding machine.

Fig. 2 is a detail sectional view through the mounting for one of the refrigerant conduits.

Fig. 3 is a similar view, partly in elevation and partly in section, of the mounting of another refrigerant conduit used in said machine.

Fig. 4 is a view similar to Fig. 2 of the mounting for the cooling means for one of the rollers of the curling mechanism.

Fig. 7 is a similar view, taken substantially from the line 7—7 of Fig. 1.

Fig. 8 is a fragmentary vertical sectional view showing a modified form of my invention.

Fig. 9 is a fragmentary detail sectional view of one type of scraper, showing my invention applied thereto, and Fig. 10 is a view similar to Fig. 9 of another type of scraper, showing my invention applied thereto.

Figure 5:
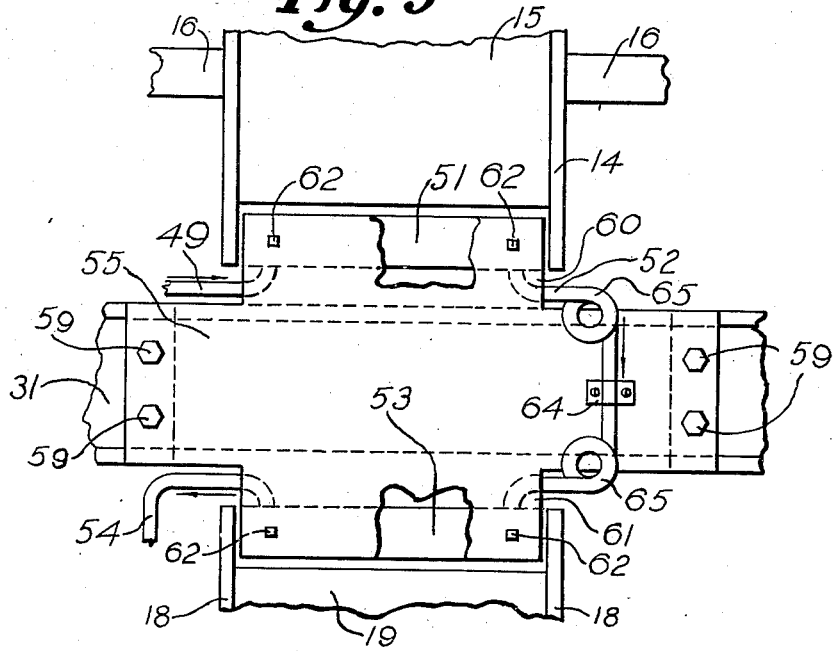
Fig. 5 is a fragmentary view in elevation on a slightly enlarged scale, partly broken away, of the machine as viewed from the line 5—5 of Fig. 1.

Referring in detail to the drawings, the rounded pieces of dough that are to be acted on by the machine are fed into the machine by means of a belt conveyor 10, operating over rollers 11, which are driven in any suitable manner, the rounded pieces of dough being deposited one at a time on the conveyor belt 10 by any suitable conveyor means. The machine is provided with any suitable frame comprising side members 12 having suitable bearings for the rollers forming part of the machine, which are driven by any suitable driving means, which is not shown. Said frame is also provided with suitable members for supporting the various guiding means and other parts that cooperate with the rollers and direct the dough through the machine. An inclined guide member 13 is provided, which extends from the discharge end of the belt conveyor 10 between the flanges 14 of a flanged roller 15, which is mounted on shaft portions 16 that are mounted in said frame 12. Cooperating with the roller 15 is a grooved roller 17, which serves to draw the rounded pieces of dough into the machine between said rollers to partially flatten the same in the first step of the sheeting operation.

Suitably mounted on the frame, and extending from between the flanges 14 of the flanged roller 15 to between the flanges 18 of the flanged roller 19, is an inclined guide member 20, the somewhat flattened pieces of dough passing from the roller 15 to the top surface of the roller 19 by sliding down the guide member 20. It will be noted that the guide member 13 deposits the rounded pieces of dough on top of the roller 15 and the roller 15 carries the rounded pieces of dough into engagement with the roller 17, whereupon the rollers 15 and 17 cooperate to flatten the rounded pieces of dough and carry it onto the guide 20, said rollers rotating in the direction indicated by the arrows in Fig. 1.

A roller 21, which is, preferably, smooth surfaced, cooperates with the roller 19 to complete the sheeting of the dough and the piece of dough that has been rolled into a flat sheet by the cooperative action of the rollers 19 and 21 passes downwardly along the surface of the guide member 22 over a grooved roller 23 and onto another grooved roller 24, said rollers 23 and 24 constituting the curling mechanism.

The roller 24 usually has curved grooves in the surface thereof, as shown in Fig. 7, and the roller 23 has inclined grooves thereon that extend at an oblique angle to a line parallel to the axis of the roller 23. The rollers 19, 21, 23 and 24 rotate in the direction indicated by the arrows in Fig. 1 and said rollers 21, 23, 24, 17 and 19 are mounted on suitable shaft portions 25, 26, 27, 28 and 80, respectively.

The molding machine of which a portion is shown herein is a common form of bread molding or loaf forming machine now in use, and while the arrangement of rollers and the character of grooves therein may vary with different makes of machines, the important thing is that certain of these rollers are provided with scrapers, as explained below. These scrapers cause heating of the rollers with which the same cooperate, and my invention cools the scrapers and the rollers to avoid the above referred to sticking action of the dough due to the heating of the rollers by the friction created by said scrapers. While certain arrangements and types of scrapers are shown in the drawings, the particular shape or mounting of a scraper can be varied, as well as the mounting of the cooling means whereby the scraper and the roller cooperating therewith are cooled.

The roller 15 has a scraper blade 29 extending between the flanges thereof and engaging frictionally with the cylindrical surface of the roller 15 between said flanges, and the roller 19 has a scraper blade 30 extending between the flanges thereof and frictionally engaging the cylindrical surface of said roller between said flanges. Said scraper blades 29 and 30 are, preferably, adjustably mounted in any well known manner on a frame member 31, such as by means of a clamping plate 32 secured by suitable securing elements 33 in clamping relation to said scraper blades. The roller 21 is also provided with a scraper blade, which is shown at 34 and is, preferably, of a curved character, extending into engagement with the roller 21 at a point shortly after the sheeted dough leaves said roller 21. Said plate is mounted between suitable flanges 35 on a bracket 36 mounted on a transverse member 37 of said machine, the scraper blade 34 being adjustable relative to the clamping portions 35 of said bracket. The roller 23 is also provided with a scraper blade, which is usually merely a continuation of the guide member 22, as shown in Fig. 1, which guide member is mounted by means of suitable fastening elements on a frame member 38 running transversely of the machine. All of said scraper blades frictionally engage the surface of the rollers with which the same cooperate. The scrapers, of course, comprise the clamping means therefor and the blades, and all the parts being of metal, the heat generated by the friction above referred to is transferred to the entire scraper, including the clamping or mounting means for the scraper.

Figure 6:
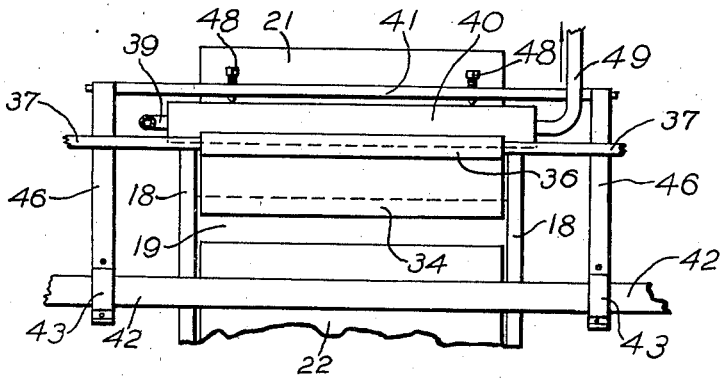
Fig. 6 is a similar view, taken substantially from the line 6—6 of Fig. 1.

The cooling means for the scrapers and the rollers shown in Figs. 1 to 7, inclusive, comprises a plurality of conduits for cooling medium engaging the scrapers and mounted closely adjacent the rollers, but with sufficient clearance between the cooling medium conduits and the rollers to prevent any frictional engagement between said conduits and rollers. Preferably, the cooling conduits are direct expansion refrigeration units, upon which frost or ice will form, and this frost or ice will contact the rollers as it builds up on the conduit portions, thus directly cooling the rollers and moistening the surfaces thereof. While any arrangement of cooling coils or conduits can be utilized and the cooling medium can be introduced into the same at any desired point, preferably, the cooling conduit portions in heat transfer relation to the rollers and scrapers are connected in series and the cooling medium is, preferably, introduced into the same through a conduit 39, which is connected in fluid-tight relation with one end of the cooling element 40, which constitutes a cooling medium conduit extending parallel to the axis of the roller 21 and engaging the scraper member having the blade 34, preferably, resting on the mounting 35 for said scraper blade. Suitable means is provided for mounting the cooling medium conduit in heat transfer relation to said scraper and the roller 21 so that the same can be adjusted both toward and away from the roller 21 and toward and away from the scraper member.

It is frequently necessary to remove scraper blades and sharpen or replace the same, and said mounting is provided so that this can be done without any interference with the cooling means. Any suitable mounting for a bar 41 may be provided on the machine, such as the transverse frame member 42, which has a pair of clamping members 43 and 44 secured thereto in clamping relation with said member 42 by any suitable fastening elements 45, one of said clamping members having an extension 46 constituting an upwardly extending bracket from the frame member 42. There are, of course, two pairs of said clamping members provided, so that a bracket 46 extends upwardly beyond each end of the cooling element 40 and a screw-threaded headed fastening element 47 extends through the bracket member 46 near the upper end thereof and into the bar 41. Said bar 41 is provided with screw-threaded openings for receiving set screws 48 that bear on the cooling element 40 and hold the same in position against the scraper member, it being obvious that the position of the member 41 and of the member 40 toward and away from the roller 21 can also be adjusted. A conduit 49 for the cooling medium extends from the opposite end of the cooling element 40 from that with which the conduit 39 is connected, said conduit 49 being connected in fluid tight relation with the cooling element 40 and, preferably, having a turn or coil 50 therein so as to provide for greater flexibility thereof.

The cooling medium conduit 49 extends from the cooling element 40 to a cooling element 51, said conduit being connected in fluid tight relation with the cooling element 51 near one end thereof, and a cooling medium conduit 52 being connected in fluid tight relation with the cooling element 51 near the other end thereof and extending to and being connected in fluid tight relation with a cooling element 53 near one end thereof, a cooling medium conduit 54 extending from and being connected in fluid tight relation with the cooling element 53 near the other end thereof, said cooling elements 40, 51 and 53 being thus connected in series.

The cooling element 51 extends with its length substantially parallel to the axis of the shaft 16, and the cooling element 53 extends with its length substantially parallel to the axis of the shaft 80. Any suitable means for mounting said cooling elements 51 and 53 between the flanges 14 and 18 of the rollers 15 and 19, respectively, in heat transfer relation to the scraper blades 29 and 30 may be provided, which will provide for the adjustment of said members 51 and 53 relative to said scrapers and relative to the rolls adjacent which the same are mounted. The cooling elements 51 and 53 are both mounted with sufficient clearance from the surface of the rollers 15 and 19 that there will be no frictional engagement of said rollers with said cooling element, and so that frost or ice may build up thereon and the frost or ice contact the surface of said rollers 15 and 19 to moisten the same, if this should be desired.

The means for mounting said cooling elements 51 and 53 in position comprises a plate-like member 55, which is mounted on the channel member 31 by suitable clamping means comprising the bar-like members 56 and the substantially U-shaped members 57 having ears thereon through which the securing elements 58 extend. Said clamping elements have the plate-like member 55 secured thereto by any suitable means, such as the securing elements 59. The plate-like member 55 is, preferably, provided with a pair of lateral extensions 60 and 61, the extension 60 extending between the flanges 14 of the roller 15 and being provided with a pair of set screws 62 that engage the cooling element 51 to secure the same in adjusted position in heat transfer relation to the scraper member 29. The extension 61 extends between the flanges 21 of the roller 19 in a similar manner and is provided with a set screw 63 for similarly mounting the cooling element 53 in position in heat transfer relation to the scraper member 30. Obviously the cooling elements 51 and 52 can be adjusted both toward and away from the scraper elements 29 and 30 and toward and away from the rollers 15 and secured in adjusted position by said set screws.

The conduit 52 may be secured to the plate-like member 55 by any suitable securing clamp 64, if this is found desirable, and may be provided with coils 65 therein to increase the flexibility thereof so as to provide for more ready adjustment of the cooling elements relative to the rollers and scrapers.

The conduit 54 extends from the cooling element 53 to one end of the cooling element 66, and a cooling medium conduit 67 extends from the other end of the cooling element 66 and from the machine. Thus the cooling element 66 is also connected in series with the other cooling elements previously mentioned. The cooling element 66 is held in adjusted position relative to the roller 23 and the scraper 22 by means of set screws 68 in the plate-like member 69, in a similar manner to that described in connection with the plate-like member 55, for holding the cooling elements 51 and 53 in position. Said plate-like member is secured to the U-shaped bracket member 70 extending around frame member 38 by means of threaded headed securing elements 71, said U-shaped member being provided with ears 72, which are secured to the bar-like member 73 by means of securing elements 74, the plate-like member 69 thus being fixed in position on the frame in a similar manner to the plate-like member 55. The member 66 is held in face to face heat transfer relation to the scraper member 22 and is, preferably, also spaced from the roller 23 so that there will be sufficient mechanical clearance between said cooling element 66 and said roller that the roller not not only be cooled by transfer of heat to the scraper element 22 and thus to the cooling element, but by means of frost or ice built up on the cooling element 66, if direct expansion refrigerating means is used for cooling purposes, and said roller 23 can thus be moistened on the surface thereof by the ice or frost which is on the cooling element 66, with which said roller engages.

It will be obvious that as the rounded dough passes into the machine it will first engage a cooled roller 15 and after being somewhat flattened in passing between the roller 15 and the roller 17 it will engage the cooled rollers 21 and 19 to complete the sheeting thereof and will finally engage the cooled roller 23 of the curling mechanism. The cooling effect on the dough itself will not be sufficient to do any harm to the dough, as the dough pieces pass rapidly through the machine, but will be sufficient that no undue heating of the dough takes place that will cause it to assume the sticky condition that is so undesirable and which causes the machine to become inefficient in operation, or substantially inoperative due to the dough sticking to the various rollers. While the roller 15 and the scraper element 29 are shown as being cooled, this is not always necessary, and in some cases sheeting rollers are provided in only single pairs, such as the rollers 19 and 21, for certain purposes in operating on dough, and it will be obvious that my invention can be applied to any of these rollers or scrapers, no matter how many are used, and either all thereof or any ones thereof that may be found desirable may be cooled, as herein described.

Instead of mounting the cooling elements on the scrapers so that the scrapers can be removed without removing the cooling elements, the cooling elements can be incorporated in the scrapers permanently and greater cooling efficiency of both the scrapers and the rollers obtained than if the cooling elements are separate from the scrapers and detachable therefrom. In Figs. 8, 9 and 10 a modified form of the invention is shown, in which such cooling elements incorporated in the scrapers are illustrated. It is, of course, to be understood that the pieces of dough in rounded condition are delivered to the machine in the same manner as shown in Fig. 1, the roller 15 being the same as shown in Fig. 1, as is also the roller 17. The roller 19 is also the same in construction as in Fig. 1 and mounted in the same manner, as is also the roller 21. The same is true of the rollers 23 and 24 and these parts rotate in the directions indicated by the arrows and the same reference numerals are applied to said parts as in the form shown in Fig. 1. The dough is operated on in the same manner as previously described and similar guiding means comprising the guide members 20 and 22' provided, the guide member 20 being the same as previously described and the guide member 22' being modified to incorporate a cooling element, as will be described below.

Mounted on the frame member 31 are the scraper elements 29' and 30', which operate in the same manner as the scraper elements 29 and 30 previously described, but which are modified in construction to incorporate cooling elements therein, the mounting of said scraper elements being the same as previously described. The scraper element 34' is mounted on the member 35 on the transverse frame member 37 in the same manner as the scraper element 34 previously described in connection with Fig. 1, but is modified to incorporate a cooling element therein. The various cooling elements are connected in series in a similar manner to that previously described.

The cooling medium is supplied to the cooling element incorporated in the scraper element 34' through a conduit 39 and passes from said cooling element to the cooling element incorporated in the scraper element 29' through a conduit 49, and a cooling medium conduit 52 extends from the cooling element incorporated in the scraper element 29' to the cooling element incorporated in the scraper element 30', and a cooling medium conduit 54 connects said last mentioned cooling element with the cooling element incorporated in the combined scraper and guide member 22'.

The various cooling elements incorporated in the scrapers are so made and associated with the scraper elements that a portion of the body of each scraper blade constitutes a wall of the cooling element. The cooling element for the scraper blade 34' is indicated generally by the numeral 81, the cooling element for the scraper blade 29' is indicated generally by the numeral 82, the cooling element for the scraper blade 30' is indicated generally by the numeral 83, and the cooling element for the scraper blade and guide member 22' is indicated generally by the numeral 84. It will be noted that each of said cooling elements is set back a slight distance from the scraping edge of the scraper blade, a portion 85 of the blade 34' extending beyond said cooling element into engagement with the roller 21, a portion 86 of the scraper blade 29' extending beyond the cooling element 82 into engagement with the roller 15, a portion 87 of the scraper blade 30' extending beyond the cooling element 83 into engagement with the roller 19, and a portion 88 of the scraper blade 22' extending beyond the cooling element 84 into engagement with the roller 23.

Each of the cooling elements 82, 83 and 84 is similarly constructed, and while only one thereof is shown in detail section in Fig. 10, the structural characteristics of the cooling element shown in Fig. 10 are common to the cooling elements 82, 83 and 84. The cooling element shown in Fig. 10 is the cooling element 83. Mounted on the scraper blade, such as the scraper blade 30' shown in Fig. 10, are a pair of bar-like members 89, which are secured in fluid tight relation by welding, brazing, or soldering, to the scraper blade. A plate-like member 90 is also secured in fluid tight relation to said bar-like members 89 and end walls 91 are secured in fluid tight relation to the bar-like members 89, the scraper blade 30' and the plate-like member 90, thus forming a conduit rectangular in cross section extending with its length transversely of the scraper blade, the scraper blade itself forming one wall of said conduit, the conduit 52, of course, entering through one wall 91 and the conduit 54 extending from the other wall 91. The cooling elements 82 and 84 are similarly constructed. It will be obvious that the scraper blades, particularly the portions thereof engaging the rollers, will be cooled to a very low temperature in this manner, and will thus extract any heat that might be created due to friction, from the roller with which each scraper blade is associated, by conduction. Of course, the heat created in the scraper blade itself due to the frictional contact thereof with the roller with which it cooperates will be counteracted so effectively by the cooling mechanism provided that said blades will never reach a temperature that will cause the transfer of any heat to the rollers. Furthermore the cooling elements 82, 83 and 84 are so associated and related to the rollers, that, if direct expansion refrigeration is used, and the tendency will be for frost or ice to build up on said cooling elements and on the scraper blades themselves, the proper spacing is provided between said cooling elements and said rollers that the ice or frost can build up on the sides of said cooling elements and the scraper blades adjacent said rollers, and will come in contact with the surfaces of said rollers and will directly cool and moisten the surfaces. Thus the rollers can be cooled directly from the cooling elements through this ice or frost, or through the interposed scraper blades by conduction.

The cooling element 81 is constructed in a somewhat similar manner to the other cooling elements, the scraper blade 34' having bar-like members 92 secured thereto in fluid tight relation in a similar manner to that above described in connection with the scraper blade 30', and a curved plate-like member 93 extending substantially parallel to the curved scraper blade 34' is mounted in fluid tight relation on said bar-like members 92 and end wall members 94 are mounted on said scraper blade 34' in fluid tight relation thereto and to the bar-like members 92 and the plate-like member 93, the conduit 39 extending into the cooling element thus provided through one of the end walls 94 thereof and the conduit 49 communicating with the interior of said cooling element through the other end wall 94. A conduit for cooling a medium, rectangular in cross section, is thus provided with its length extending transversely of the scraper blade 34' set back a predetermined distance from the roller engaging edge of said blade 34', and said blade 34' will thus be cooled, and through conduction due to contact thereof with the roller 21, will cool said roller. Furthermore the scraper blade 34' extending closely adjacent and being curved similarly to the curved surface of the roller 21 will, if direct expansion refrigerating means is used, build up frost or ice thereon and said frost or ice will contact the surface of the roller 21 to directly cool the same instead of by conduction through the extending end 85 of the scraper blade, and will also moisten the surface of the roller 21. It is, of course, to be understood that it is not necessary to moisten the surface of the rollers above referred to by such frost or ice as referred to herein, but the same can be moistened by condensation of the air thereon, by cooling the same below the dew point, which is not difficult to accomplish by means of either brine or direct expansion of a gas in the cooling elements.

While direct expansion refrigeration is preferred, because the most efficient cooling can be obtained in this manner and the effect of the frost or ice that forms on the cooling elements above referred to can be obtained when direct expansion refrigeration is utilized, brine or other cooling medium can also be satisfactorily used under certain conditions and other circulating cooling medium, such as a cold liquid, even cold water, can be used to obtain cooling that will reduce the sticking action of the dough. As large amounts of flour have to be constantly dusted into the machine where no cooling of the rollers is utilized, it will be obvious that in addition to the greater reliability of operation in the machine obtained by using the cooling means herein described, a very large amount of flour can be saved, thus reducing the cost of operation of a molding or other dough shaping machine.

What I claim is:

1. In a dough shaping machine, a roller, a scraper engaging said roller and means for cooling said roller and said scraper, comprising means for conducting a cooling medium into heat transfer relation to said roller and scraper, including a conduit extending in contact with said scraper substantially parallel to the axis of said roller in such close adjacency to the dough contacting face of said roller that frost built up thereon will contact the dough contacting face of said roller.

2. In a dough shaping machine, a roller and means for cooling said roller, comprising means for conducting a cooling medium into heat transfer relation to said roller, including a conduit extending substantially parallel to the axis of said roller in close adjacency to the dough contacting face thereof, and means for adjusting said conduit relative to said roller to a position that frost built up thereon will contact said roller.

3. In a dough shaping machine, a roller, a scraper engaging said roller, and means for cooling said roller and said scraper, comprising means for conducting a cooling medium into heat transfer relation to said roller, including a conduit extending substantially parallel to the axis of said roller in close adjacency to the dough contacting face thereof and in contact with said scraper, and means for adjusting said conduit relative to said roller and scraper to a position that frost built up thereon will contact said roller.

4. In a dough shaping machine, a roller, a scraper engaging said roller and means for cooling said roller, comprising a cooling element mounted directly on said scraper, a portion of said scraper forming a wall of said cooling element.

5. In a dough shaping machine, a roller, a scraper engaging said roller and means for cooling said roller, comprising a cooling element mounted directly on said scraper and extending substantially parallel to the axis of said roller adjacent the curved surface thereof, a portion of said scraper forming a wall of said cooling element.

6. In a dough shaping machine, a roller, a frame member, a scraper secured to said frame member and engaging said roller, and means for cooling said roller and said scraper, comprising means for conducting a cooling medium into heat transfer relation to said roller and scraper, comprising a conduit for said cooling medium and means for securing said conduit in contact with said scraper substantially parallel to the axis of said roller, comprising a bracket on said frame member having a plate-like member extending therefrom toward said roller and clamping means on said plate-like member engaging said conduit, said conduit being adjustable toward and away from said roller.

MERLIN A. STICELBER.